United States Patent [19]
Williams et al.

[11] Patent Number: 5,701,161
[45] Date of Patent: Dec. 23, 1997

[54] METHOD AND APPARATUS FOR PROVIDING REAL TIME DATA ON A VIEWING SCREEN CONCURRENTLY WITH ANY PROGRAMING IN PROCESS

[76] Inventors: Mark C. Williams, 3849 N. Capital Ave., Indianapolis, Ind. 46208; Timothy W. Price, 5779 Sebring Dr., Indianapolis, Ind. 46254

[21] Appl. No.: 358,074

[22] Filed: Dec. 14, 1994

[51] Int. Cl.$^6$ ............................ H04N 7/08; H04N 7/087; H04N 5/445
[52] U.S. Cl. ...................... 348/468; 348/478; 348/564
[58] Field of Search .................... 348/6, 8, 9, 468, 348/473, 476, 478, 479, 563, 564, 584, 589; H04N 5/445, 7/08, 7/087, 7/093, 7/18

[56] References Cited

U.S. PATENT DOCUMENTS

| | | | |
|---|---|---|---|
| 3,993,955 | 11/1976 | Belcher et al. | 325/308 |
| 4,476,488 | 10/1984 | Merrell | 358/86 |
| 4,575,750 | 3/1986 | Callahan | 358/86 |
| 4,862,268 | 8/1989 | Campbell et al. | 348/478 |
| 5,008,750 | 4/1991 | Gomikawa | 348/468 |
| 5,109,279 | 4/1992 | Ando | 348/468 |
| 5,121,430 | 6/1992 | Granzer et al. | 380/48 |
| 5,249,049 | 9/1993 | Kranawetter et al. | 348/473 |
| 5,309,234 | 5/1994 | Kranawetter et al. | 348/473 |
| 5,345,270 | 9/1994 | Saeger et al. | |
| 5,351,135 | 9/1994 | Saeger | 348/435 |

FOREIGN PATENT DOCUMENTS

| | | | |
|---|---|---|---|
| 61-72486 | 4/1986 | Japan | H04N 7/087 |
| 3135283 | 6/1991 | Japan | H04N 7/087 |

*Primary Examiner*—Victor R. Kostak
*Assistant Examiner*—John W. Miller

[57] ABSTRACT

A computer microcontroller (225) controls the operational functions of a video reporter (10) for superimposing real time emergency broadcast messages and information on a television picture concurrently with any programing in progress. The video reporter (10) has a signal splitting means for splitting a television broadcast signal such that the signal is transmitted to the video reporter and a TV. A tuner (210) constantly scans predetermined channels for video reporter messages of the type to be superimposed. The video messages are embedded in intelligent data having a preamble (810) which enables the microcontroller to identify the message type and determine whether it is superimposable.

There is a decoding means (230) for decoding the video reporter data and a message extracting means (240) for extracting messages from the video reporter data. An overlay generating means (250) generates a video signal from the video reporter data and the video signal can be superimposed over any television picture of the programing in progress, including VCR, video game, and other programing by means for superimposing the video signal over the television picture (260).

25 Claims, 12 Drawing Sheets

METHOD AND APPARATUS FOR PROVIDING REAL TIME DATA ON A VIEWING SCREEN CONCURRENTLY WITH ANY PROGRAMMING IN PROCESS

BACKGROUND

The present invention pertains to television receivers and more particularly pertains to an apparatus and method for superimposing real time emergency broadcast messages and information on a television picture concurrently with any programing in progress.

In 1963, President John F. Kennedy established the Emergency Broadcast System (EBS) and allowed stations to transmit on their normal frequencies during an emergency. Technical requirements for EBS equipment were developed in the 1960's and included an audio/analog two-tone alerting signal.

The current EBS is composed of technical equipment and an operational structure which provides guidance to those broadcast stations and others who participate in EBS. It is a joint government-industry effort which responds to a Presidential requirement to address the entire nation on very short notice because of a grave national threat. It uses the facilities of the communications industry, including 13 radio and 5 television networks, 12 cable networks, the Associated Press, Reuters and United Press International wire services, and over 13,000 broadcast stations.

Technically, EBS is an analog transmission system in which broadcasters are required to have specified equipment and relies upon operator control. During an alert, EBS equipment transmits audio EBS messages after receipt of a two-tone attention signal, which activates the decoder/receiver at a broadcast radio or TV station. The EBS station operator must listen to the audio message coming out of the speaker (of the decoder/receiver) to determine the reason the EBS signal has been transmitted. The two-tone Attention Signal generated by the encoder does not carry any intelligent information. It merely turns on or activates the decoder/receiver.

If the audio message was a test of the system, the test date and time are logged. If the message is for a national emergency, they must alert the public. If the message is for a state or local emergency, responding personnel have a number of options, including ignoring or rebroadcasting the message.

The Federal Communications Commission (FCC) requires the use of EBS only in the event of a national emergency. State and local authorities, however, may request use of the EBS to provide early warning to communities about regional, state, county, and local emergencies. More than 20,000 activations of the EBS have been reported since 1975, and every state and territory has used it. State and Local Emergency Communications Committees (SECC and LECC) are responsible for the development of plans which detail procedures for stations and officials to follow for activation of the EBS. Broadcast stations have voluntarily made increasing use of EBS since the system was allowed to be used for local emergencies.

The current EBS has several significant drawbacks. First, the equipment heretofore available relies on the broadcaster who receives the initial alert to alert other broadcasters in a "daisy chain." "Daisy chain" monitoring refers to the present day system where key stations relay EBS messages with the two-tone signal from one station to another. The daisy chain is often unreliable, as stations are completely dependent on the station they monitor to activate the EBS system. The prior art like that disclosed in U.S. Pat. No. 4,862,268 has similar limitations, since only information originating from the channel being viewed may be transmitted. With the EBS system, if the key "upstream" station fails to activate, stations further down the chain are not alerted to the emergency and, therefore, cannot inform their audiences. There has been no monitoring of multiple sources for emergency alerts. In addition, operators must be trained in EBS activation procedures in order to send and receive emergency notifications.

Second, much EBS equipment dates back several decades. Very few manufacturers produce repair parts for EBS equipment. If a broadcaster had to purchase replacement EBS equipment, the replacement costs would be comparable to the cost for new digital equipment. Moreover, even if the current equipment could be economically maintained, cable participation in EBS would be severely handicapped because the present signaling scheme does not lend itself to unattended operation.

Third, when an emergency strikes, the EBS can still fail even if the alert is forwarded to the next station in the chain, the equipment is working properly, and the operating personnel are knowledgeable because the current EBS relies on station personnel to acknowledge and relay the alert, which can cause critical delays. Seconds may mean the difference between life and death during sudden emergencies such as tornadoes, flash floods, hazardous chemical spills, and nuclear accidents. In addition, current EBS equipment does not allow participants to alert the public selectively in the event of an emergency. For example, an EBS alert warning of a flood may be of little value to viewers and listeners located in more distant locations.

After every major disaster, the National Oceanic Atmospheric Administration (NOAA) conducts a survey to determine the effectiveness of warning systems. Approximately 80 percent of these surveys have indicated the need for improvements in the EBS because of deficiencies inherent in the old system. These disadvantages have become more apparent as audiovisual and communications technology has advanced. Besides cable and satellite television, viewers are inundated with video games, VCR programming, video shopping, video cameras, disks, home computers, and so on, each of which takes them out of the "real time" world. Thus, new emergency alert and information means must be capable of interrupting VCR programming and video games and the like. The same technological improvements make it necessary that all kinds of information, not only emergency messages, be made available without delay to as many people as possible.

In 1990, the hearing impaired were given easier access to television programming when Congress passed the Television Decoder Circuitry Act in 1990, Public Law 101-431, requiring most television receivers manufactured or imported for use in the United States be equipped with certain decoder circuitry by Jul. 1, 1993. The law makes programing available with subtitles in various languages for the hearing impaired. Thus, there is a need for linking all persons, including the hearing impaired, with immediate access to all kinds of broadcast information, especially emergency messages.

Therefore, it is highly desirable to provide an improved apparatus and method for superimposing real time emergency broadcast messages and information on a television picture concurrently with any programing in progress.

It is also highly desirable to provide an improved apparatus and method for superimposing real time emergency broadcast messages and information on a television picture concurrently with any programing in progress which do not rely on the broadcaster who receives the initial alert to alert other broadcasters in a "daisy chain."

It is also highly desirable to provide an improved apparatus and method for superimposing real time emergency broadcast messages and information on a television picture concurrently with any programing in progress which are not dependent upon the station they monitor to activate the EBS system.

It is also highly desirable to provide an improved apparatus and method for superimposing real time emergency broadcast messages and information on a television picture concurrently with any programing in progress which are capable of monitoring multiple sources for emergency messages and information.

It is also highly desirable to provide an improved apparatus and method for superimposing real time emergency broadcast messages and information on a television picture concurrently with any programing in progress which are not dependent upon operators trained in EBS activation procedures.

It is also highly desirable to provide an improved apparatus and method for superimposing real time emergency broadcast messages and information on a television picture concurrently with any programing in progress which are inexpensive, easy to repair and can interact with all technologies.

It is also highly desirable to provide an improved apparatus and method for superimposing real time emergency broadcast messages and information on a television picture concurrently with any programing in progress which are compatible with all cable broadcasters.

It is also highly desirable to provide an improved apparatus and method for superimposing real time emergency broadcast messages and information on a television picture concurrently with any programing in progress which lends itself to unattended operation.

It is also highly desirable to provide an improved apparatus and method for superimposing real time emergency broadcast messages and information on a television picture concurrently with any programing in progress which do not rely on station personnel to acknowledge and relay the information and/or alert.

It is also highly desirable to provide an improved apparatus and method for superimposing real time emergency broadcast messages and information on a television picture concurrently with any programing in progress that are capable of informing and alerting the public selectively depending, for example, on their geographic location in the event of an emergency.

It is also highly desirable to provide an improved apparatus and method for superimposing real time emergency broadcast messages and information on a television picture concurrently with any programing in progress which are capable of simultaneously handling teletext data, emergency message data and closed caption text data.

It is finally highly desirable to provide an improved apparatus and method for superimposing real time emergency broadcast messages and information on a television picture concurrently with any programing in progress which meets all the above desired features.

SUMMARY

Therefore, it is an object of the invention to provide an improved apparatus and method for superimposing real time emergency broadcast messages and information on a television picture concurrently with any programing in progress.

It is also an object of the invention to provide an improved apparatus and method for superimposing real time emergency broadcast messages and information on a television picture concurrently with any programing in progress which do not rely on the broadcaster who receives the initial alert to alert other broadcasters in a "daisy chain."

It is also an object of the invention to provide an improved apparatus and method for superimposing real time emergency broadcast messages and information on a television picture concurrently with any programing in progress which are not dependent upon the station they monitor to activate the EBS system.

It is also an object of the invention to provide an improved apparatus and method for superimposing real time emergency broadcast messages and information on a television picture concurrently with any programing in progress which are capable of monitoring multiple sources for emergency messages and information.

It is also an object of the invention to provide an improved apparatus and method for superimposing real time emergency broadcast messages and information on a television picture concurrently with any programing in progress which are not dependent upon operators trained in EBS activation procedures.

It is also an object of the invention to provide an improved apparatus and method for superimposing real time emergency broadcast messages and information on a television picture concurrently with any programing in progress which are inexpensive, easy to repair and can interact with all technologies.

It is also an object of the invention to provide an improved apparatus and method for superimposing real time emergency broadcast messages and information on a television picture concurrently with any programing in progress which are compatible with all cable broadcasters.

It is also an object of the invention to provide an improved apparatus and method for superimposing real time emergency broadcast messages and information on a television picture concurrently with any programing in progress which lends itself to unattended operation.

It is also an object of the invention to provide an improved apparatus and method for superimposing real time emergency broadcast messages and information on a television picture concurrently with any programing in progress which do not rely on station personnel to acknowledge and relay the information and/or alert.

It is also an object of the invention to provide an improved apparatus and method for superimposing real time emergency broadcast messages and information on a television picture concurrently with any programing in progress that are capable of informing and alerting the public selectively depending, for example, on their geographic location in the event of an emergency.

It is also an object of the invention to provide an improved apparatus and method for superimposing real time emergency broadcast messages and information on a television picture concurrently with any programing in progress which are capable of simultaneously handling teletext data, emergency message data and closed caption text data.

It is finally an object of the invention to provide an improved apparatus and method for superimposing real time emergency broadcast messages and information on a television picture concurrently with any programing in progress which meets all the above desired features.

In the broader aspects of the invention there is provided a video reporter for superimposing real time emergency broadcast messages and information on a television picture concurrently with any programing in progress having a signal splitting means for splitting a television broadcast signal into at least a first television signal and a second video reporter signal. A scanning means for continuously scanning the video reporter signal for predetermined channels with video reporter data thereon is provided. There is a decoding means for decoding the video reporter data and a message extracting means for extracting messages from the video reporter data. There is also provided a message selecting means for selecting the messages to be superimposed on the television picture and an overlay generating means for generating a video signal from the video reporter data for superimposing over the television picture. The video signal is superimposed over the television picture of the programing in progress by means for superimposing the video signal over the television programing in progress.

The video reporter also has a first programing means for selectively programing input data, which includes the channels to be scanned and the type of messages to be superimposed on the television picture.

There is a storing and retrieving means for storing and retrieving the video reporter data and the input data and a second programing means for selectively programing at least one video reporter-specific address such that the video reporter can receive the television broadcast signal from a particular broadcast station as desired.

There is a text to speech synthesizing means for synthesizing an audio message from the messages to be superimposed, and a tone generating means for generating an audible tone and a visual indicator producing means for producing a visual indicator, both to alert a viewer to the messages to be superimposed.

The television broadcast signal includes teletext and closed caption text data, and the superimposing means is capable of superimposing various data simultaneously over the television picture in progress, including video reporter data, teletext data and closed caption text data. An optional printing means may be provided for printing the various data.

There is also a computer microcontroller, which operates the video reporter. There is a VCR interrupting means and a video game interrupting means for interrupting VCR programing and video game programing in progress.

Finally, the video reporter can be a separate unit or may be housed within a television set and has a television power switching means for automatically powering a television on and off.

In the broader aspects of the method of the invention the steps include splitting a television broadcast signal into at least a first television signal and a second video reporter signal, continuously scanning the video reporter signal for predetermined channels having video reporter data thereon, repeating the scanning step until video reporter data is detected, decoding the video reporter data, extracting messages from the video reporter data, selecting the messages to be superimposed on the television picture, generating a video signal from the video reporter data for superimposing over the television picture, and finally superimposing the video signal over the television picture of the programing in progress.

There is also a method of controlling and coordinating the operation of a video reporter including the steps of constantly reading user input data storage means for detecting user input data, constantly determining command functions of the video reporter from the input data, constantly revising the command functions in consideration of the user input data, instructing a scanning means for continuously scanning a video reporter signal to scan predetermined channels until video reporter data is detected by the scanning means, selecting and extracting messages imbedded in the video reporter data for superimposing over a television picture, and instructing tone generating means to generate an audible tone for alerting a viewer to the messages to be superimposed, instructing text to speech synthesizing means to synthesize an audio message from the messages to be superimposed, powering on a television set, initiating superimposing means for superimposing the video reporter data over the television picture of the programing in progress, initiating storage and retrieving means for storing and retrieving the video reporter data, and powering off the television set.

DRAWING

The above mentioned and other features and objects of the invention and the manner of attaining them will become more apparent and the invention itself will be better understood by reference to the following description of an embodiment of the invention taken in conjunction with the accompanying drawings and descriptive matter in which there is illustrated preferred embodiments of the invention.

DESCRIPTION

Figure 1:
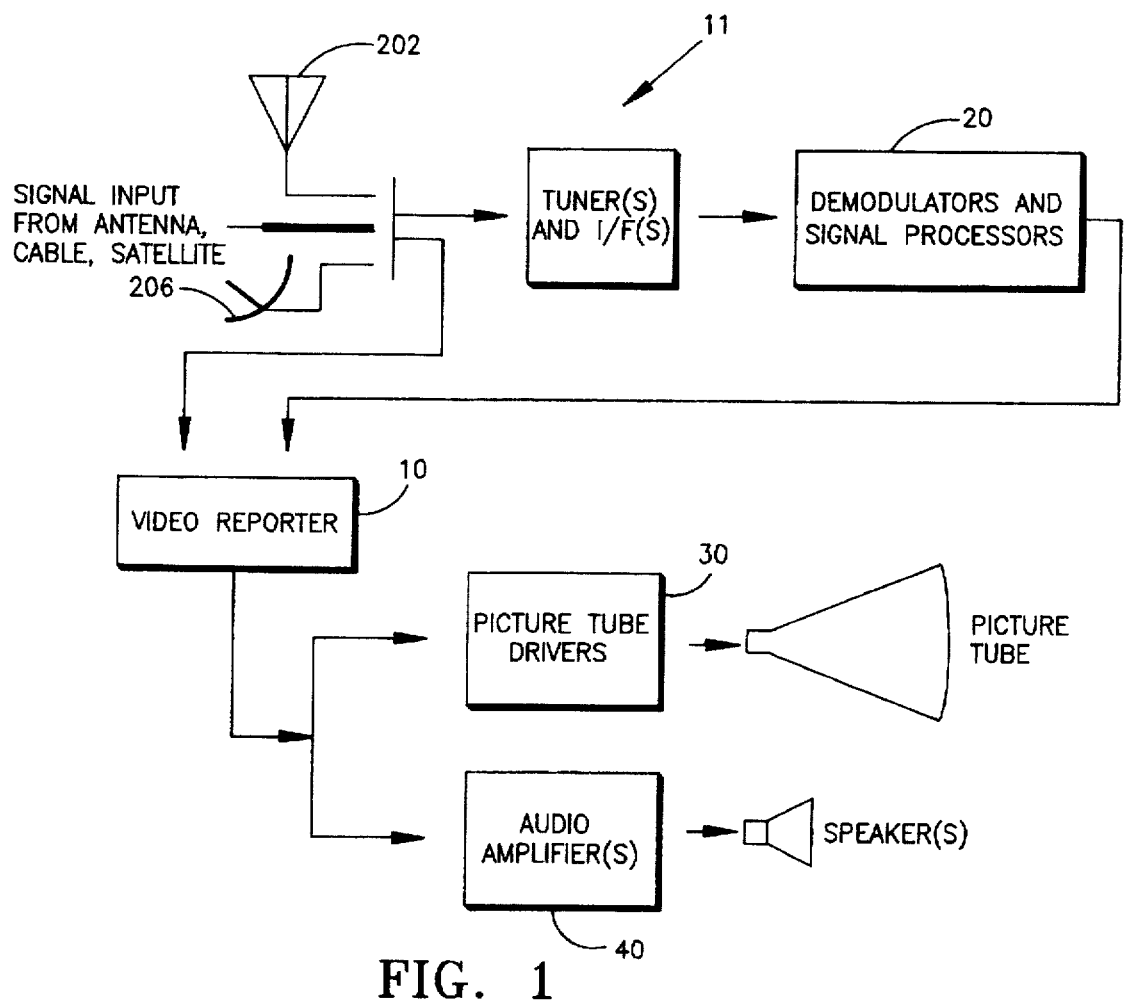
FIG. 1 is a simplified block diagram of a television control system showing an embodiment of the video reporter of the present invention.

As shown in the simplified block diagram in FIG. 1, video reporter 10 resides between the demodulators and signal processors 20 and the picture tube drivers 30 and audio amplifiers 40 of television control system 11. In an embodiment, video reporter 10 is connected to the radio frequency (RF) input 200 to a television. In another embodiment, video reporter 10 receives its input as intermediate frequency (IF) signal or from a baseband signal.

Signal 200 comes from an antenna 202, cable 204, satellite 206, or other means as desired and includes teletext and closed caption text data. In the preferred embodiment signal 200 includes video reporter messages (emergency messages). A video reporter message is encoded and transmitted during the horizontal blanking period, which is not used for television picture transmission. Video reporter 10 simultaneously receives, processes and displays video reporter messages, teletext and closed caption text data.

Figure 2:
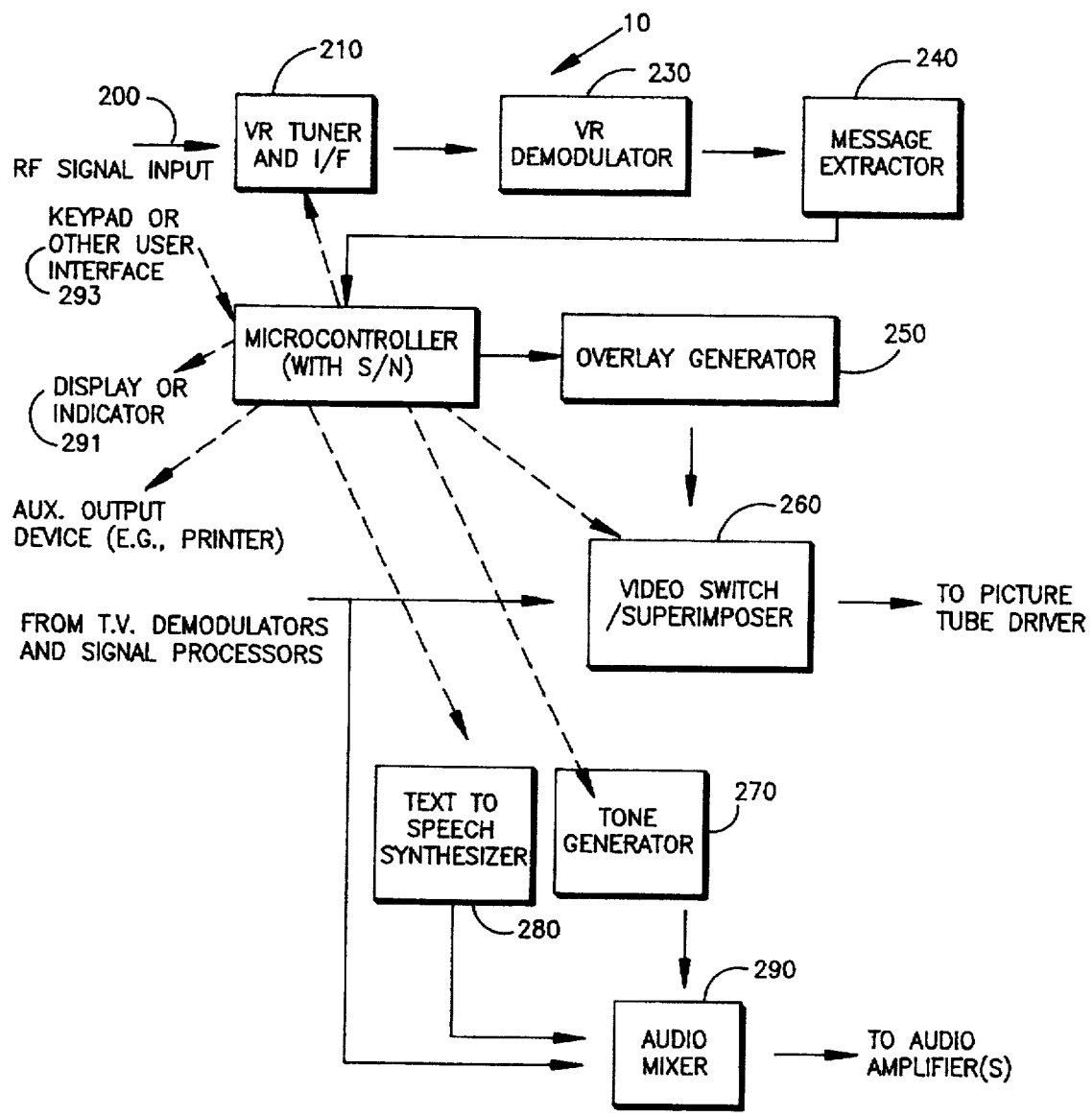
FIG. 2 is a simplified block diagram of an embodiment of the video reporter of the invention.

Referring to FIG. 2, video reporter 10 has VR tuner and I/F 210, video reporter demodulator 230 (decoding means), message extractor 240, overlay generator 250, video switch/ superimposer 260, tone generator 270, text to speech synthesizer 280, audio mixer 290 and flash indicator 291.

Figure 3:
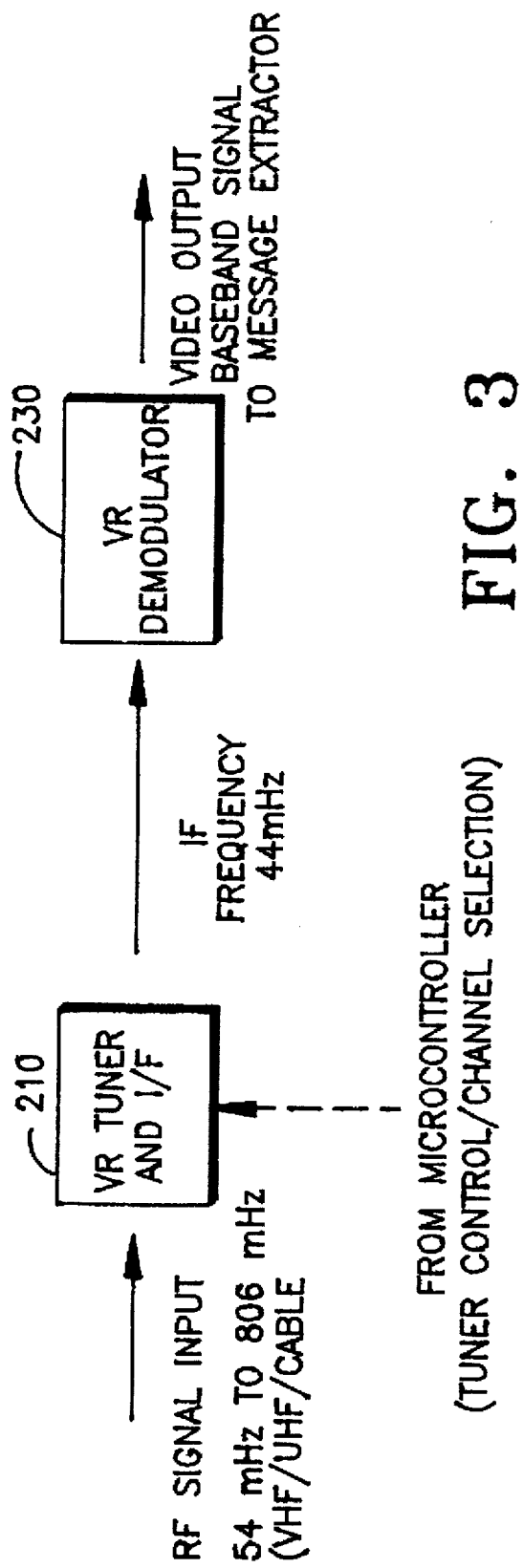
FIG. 3 is a simplified block diagram showing embodiments of the scanning means and the decoding means of the invention.

Referring now to FIG. 3, video reporter tuner/IF 210 and demodulator 230 are shown. Video reporter tuner/IF 210 and demodulator 230 are the kind found in TVs and perform similar functions in video reporter 10. In one embodiment, a TV equipped with video reporter 10 needs at least two tuners and two I/Fs 210 and two demodulators 230, one set for viewing the program and another set to provide a signal for video reporter 10, thus enabling video reporter 10 to scan or tune to different channels from the one being viewed. The viewing program may be a VCR or cable station and not have real time reports. Another embodiment has a video reporter/TV assembly equipped with picture in picture (PIP). In that embodiment, tuner, I/Fs 210 and demodulators 230 exceed two.

Figure 4:
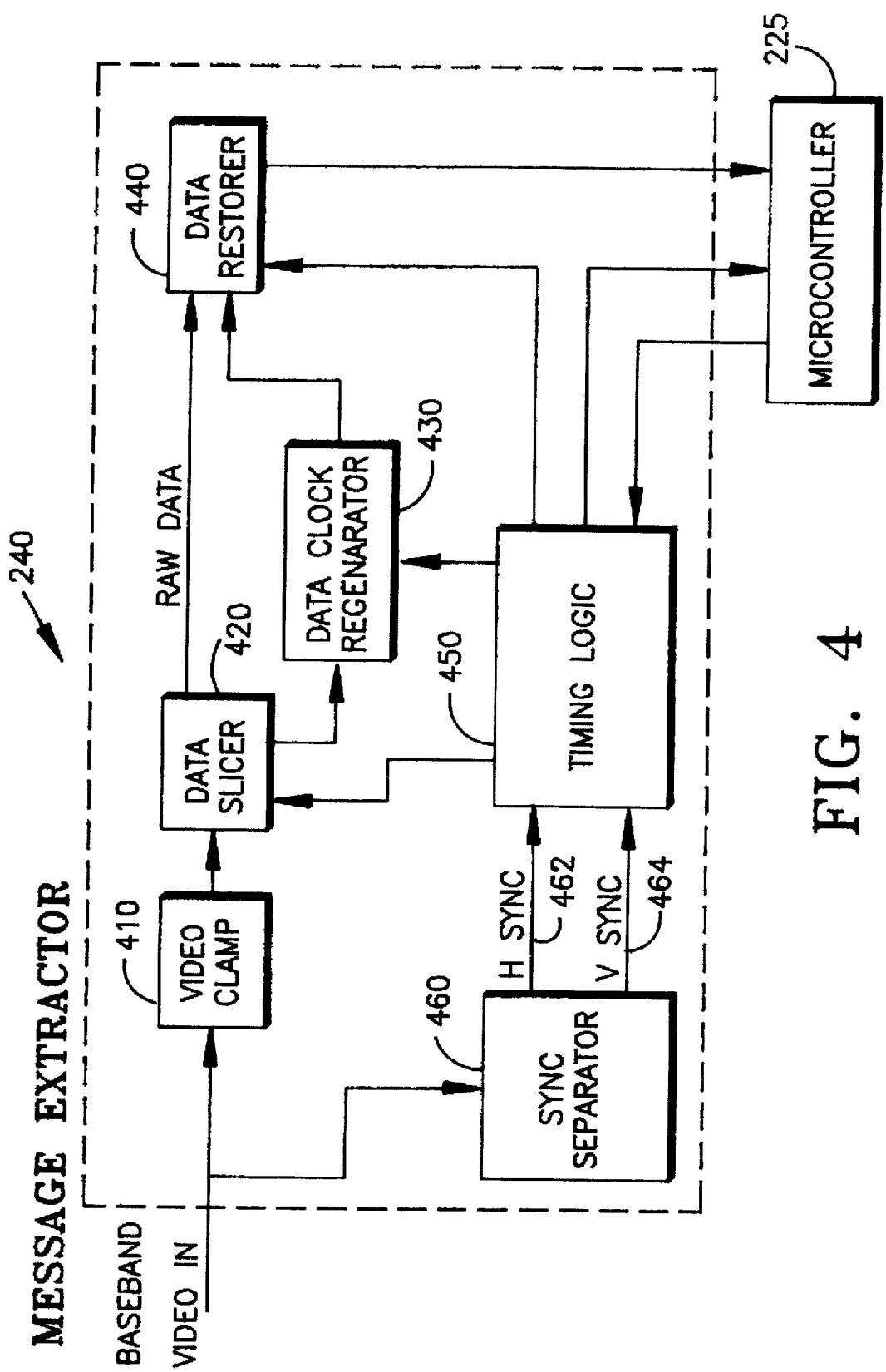
FIG. 4 is a simplified block diagram of the message extracting means shown in FIG. 2.

FIG. 4 shows a detailed diagram of message extractor 240. Message extractor 240 includes video clamp 410, sync separator 460, data slicer 420, data clock regenerator 430 and data restorer 440, and is under the direction of microcontroller 225.

Microcontroller 225 supports the functionality of video reporter 10. Microcontroller 225 is at least one computer microprocessor having integrated RAM and ROM memory with input and output user interface 293, such as a key pad or remote control. Microcontroller 225 is capable of storing and retrieving video reporter message data and input data. In addition, a unique serial number is assigned to each microcomputer within video reporter 10 making each video reporter 10 accessible to particular broadcaster(s) as desired. In addition, the viewer can configure the video reporter 10, via microcontroller 225, for the types of messages that may interrupt programming.

Video reporter 10 operates in numerous modes, including a report mode, an interactive mode and a scan mode. In the scan mode, microcontroller 225 sends commands to tuner 210, causing it to tune to specified channel frequencies for video reporter messages. Microcontroller 225 stays on each channel long enough to determine if a video reporter message is present.

Tuner 210 engages demodulator 230 upon detecting the "flavor" of the message type to be superimposed. The output of video reporter Tuner/IF 210 goes to demodulator 230. Demodulator output is a baseband signal which is ready for processing by message extractor 240. When message extractor 240 receives a report, it sends the data to microcontroller 225. Microcontroller 225 determines whether the report is the type that requires interrupting the current programing and superimposing on the television picture.

Figure 8:
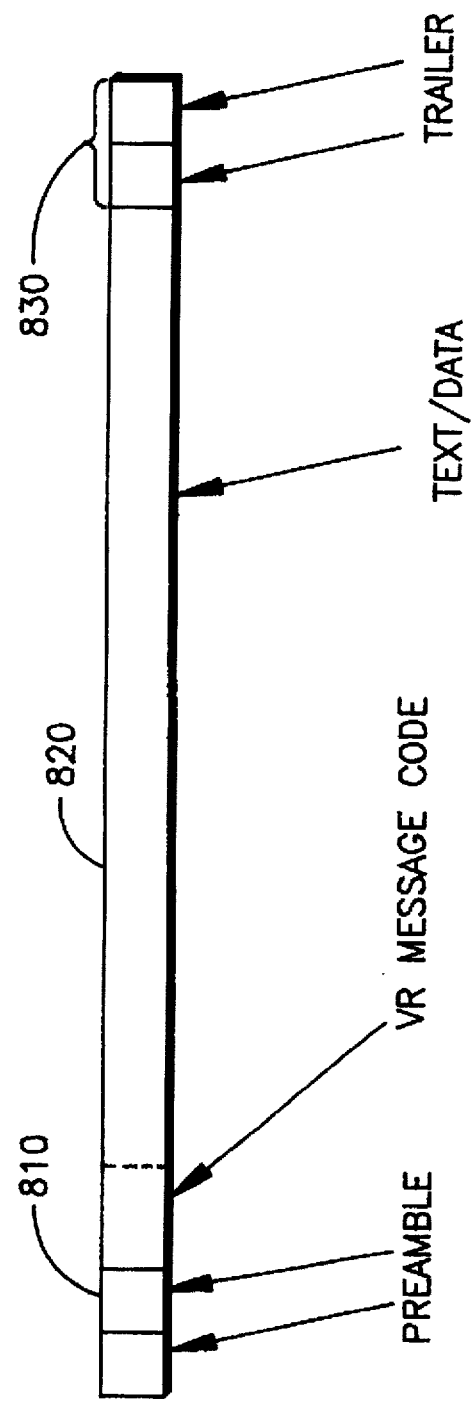
FIG. 8 is a simplified block diagram of text/data embedded in the baseband signal.

Microcontroller 225 reads this data, interpreting and translating closed caption codes. Data is sent as a block with preamble 810, a variable number of characters of text, followed by end-of-caption code, as shown in FIG. 8. The preamble codes are used to determine the type of text that will follow. Table 1 shows the preamble codes used by closed caption and teletext, and the codes for video reporter 10. As with closed caption and teletext, video reporter 10 supports a primary language and a secondary language. Video reporter 10 uses similar display format and message structure as closed caption.

TABLE 1

PREAMBLE CODES

| Char # | Values | Usage | Description |
| --- | --- | --- | --- |
| 1 | 11H - 14H | CC/Teletext | Data Channel 1 |
| 1 | 19H - 1CH | CC/Teletext | Data Channel 2 |
| 1 | AOH - AFH | Video Reporter | Data Channel 3 |
| 1 | BOH - BFH | Video Reporter | Data Channel 4 |
| 2 | 20H | CC | Caption Data Start |
| 2 | 2AH - 2BH | Teletext | Teletext Data Start |
| 2 | AOH - AFH | Video Reporter | Video Interactive |
| 2 | BOH - BFH | Video Reporter | Video Address Code |
| 2 | COH - CFH | Video Reporter | System Exclusive |

TABLE 2

END OF CAPTION CODES

| Char # | Values | Usage | Description |
| --- | --- | --- | --- |
| 1 | 11H - 14H | CC/Teletext | Primary Language |
| 1 | 19H - 1CH | CC/Teletext | Secondary Language |
| 2 | 2DH | (A11) | Carriage Return |
| 2 | 2FH | CC | End of Caption |
| 2 | DOH - DFH | Video Frequency | End of Report |

Referring to FIG. 4, the input to message extractor 240 is a baseband video signal. This signal goes to video clamp 410, which establishes a reference voltage level for the signal. The input signal is also directed to sync separator 460, which extracts the horizontal sync (H Sync) 462 and the vertical sync (V SYNC) 464 signals. The H Sync and V Sync signals 462,464 are used to coordinate the functions of data slicer 420, data clock regenerator 430, data restorer 440, and microcontroller 225.

Figure 5:
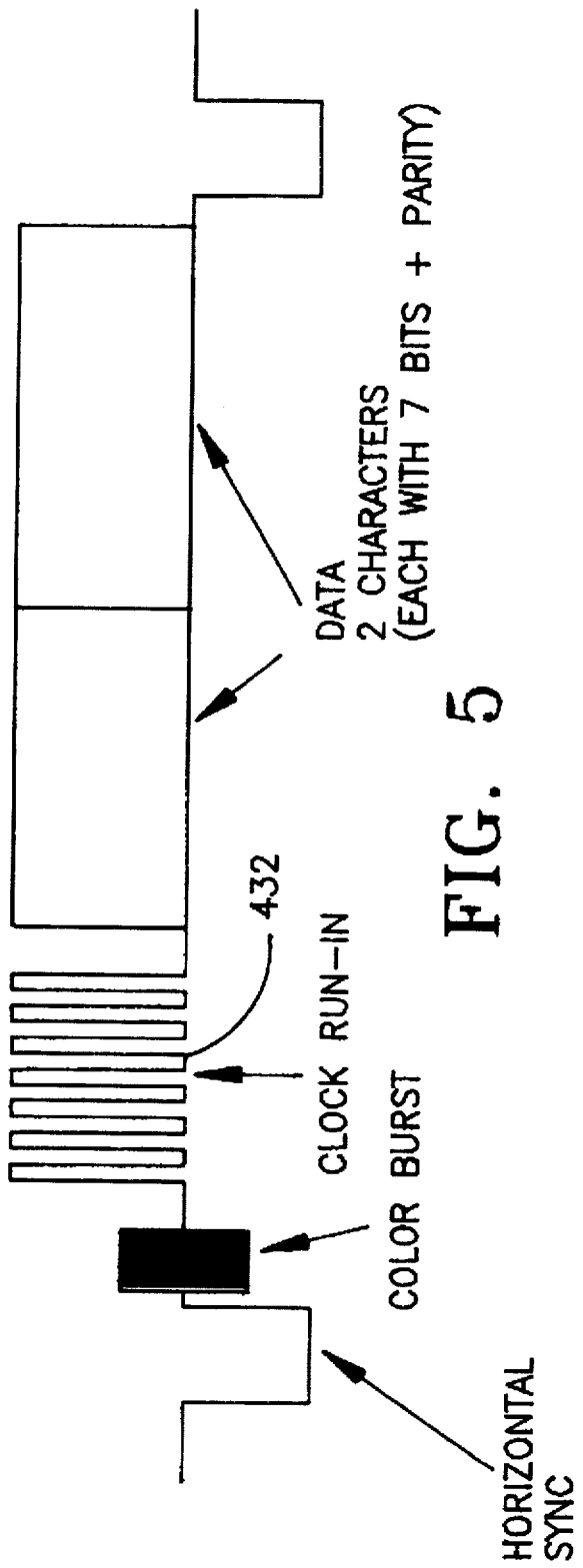
FIG. 5 is a simplified block diagram of the data clock generator of the message extracting means shown in FIG. 4.

Referring to FIGS. 4 and 5, the output from video clamp 410 is only examined when data slicer 420 receives a signal from timing logic 450. This output from timing logic 450 to data slicer 420 occurs whenever line 21 is present, as shown in FIG. 5. Data slicer 420 extracts clock run-in 432, which goes to data clock regenerator 430, as shown in FIG. 4. This is essentially a phased-locked loop that regenerates the timing pulses needed to clock in the data bits. Data slicer 420 also extracts the raw data, which begins after the clock run-in 432, and routes it to data restorer 440, which transforms a serial bit stream into data bytes. Data restorer 440 operates synchronously, and uses a clock signal from data clock regenerator 430.

If the report is the type that requires interrupting the current programing and superimposing it on the television picture, microcontroller 225 instructs overlay generator 250 to generate the proper video signal. Video Switch/ Superimposer 260 then superimposes the signal over the current programing in progress. Concurrently, microcontroller 225 causes tone generator 270 to generate an audible signal (beep or buzz) to alert the viewer of the emergency message or information on the TV screen.

Figure 6:
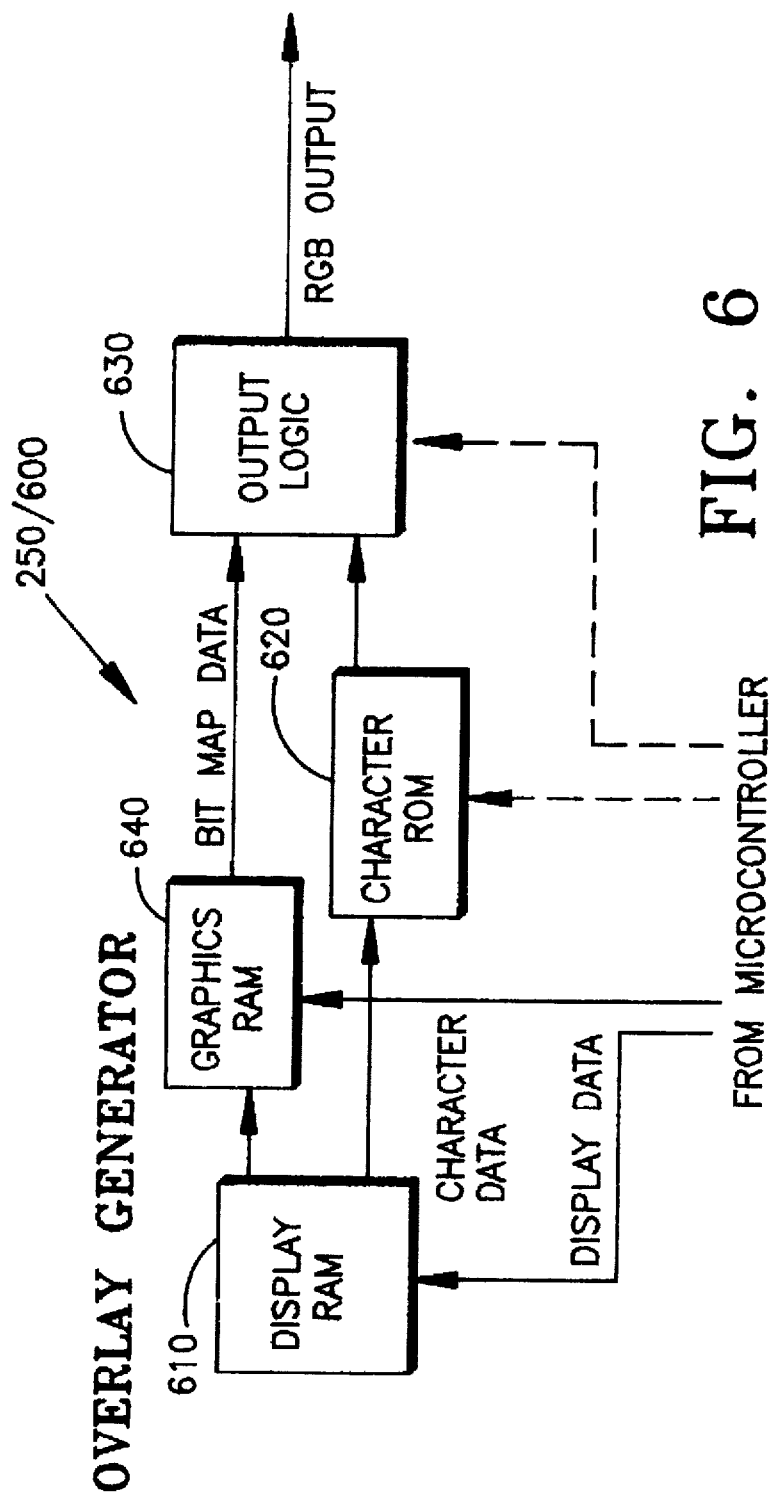
FIG. 6 is a simplified block diagram of the overlay generating means shown in FIG. 2.

Microcontroller 225 receives all of the recovered data from data restorer 440 and routes the data to overlay generator 600, as shown in FIG. 6. When operating in closed caption mode, microcontroller 225 writes data to display RAM 610. Display RAM output goes to character ROM 620 which outputs the bit pattern necessary for displaying the corresponding characters. One embodiment of video reporter 10 has display RAM 610 and character ROM 620 integral with microcontroller 225, and another embodiment has display RAM 610 and character ROM 620 external to microcomputer 225. This bit pattern goes to output logic 630 which generates the proper RGB voltages.

When overlay generator 600 is operating in report mode, the output from display RAM 610 is transmitted to graphics RAM 640 and then to output logic 630. Microcontroller 225 writes character codes to display RAM 610, which are translated by graphics RAM 640 into a bitmap which then is transmitted to output logic 630, thus enabling video reporter 10 to support bit-mapped graphics for displaying logos and other graphical objects in connection with the broadcast emergency messages and information. Graphics RAM 640 is loaded by microcontroller 225 from its internal ROM or from data downloaded (as special report message) from the broadcasting station.

Figure 7:
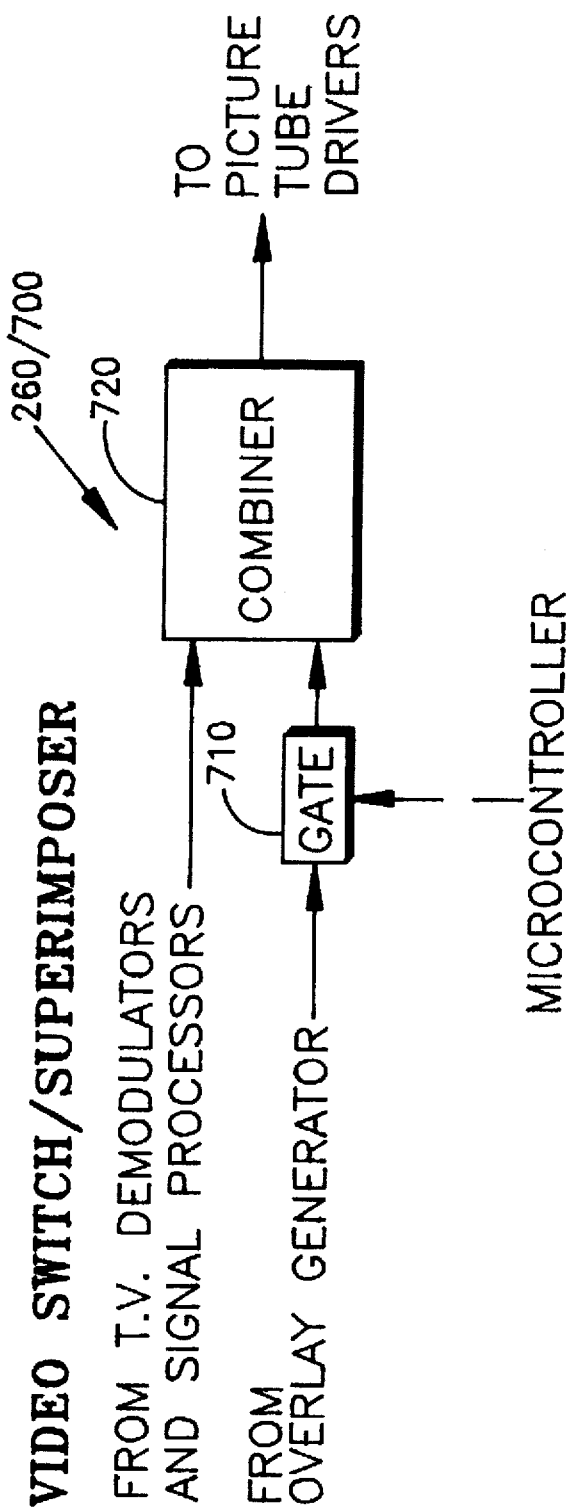
FIG. 7 is a simplified block diagram of the superimposing means shown in FIG. 2.

Referring to FIG. 7, superimposing means, video Switch/ Superimposer 700 combines existing TV programing with the output from overlay generator 600. The Combiner "places" the output from overlay generator 600 "on top of" the video signal from T.V. demodulators and signal processors 20. Gate 710 ms inserted between combiner 720 and overlay generator 600. When activated, gate 710 switches off any signal present from overlay generator 600.

The emergency message or information is displayed on the television picture for a period of time determined by the station originating the transmission. The format for the report display consists of two parts (1) the body of the text or message and (2) an icon or graphical image. In an embodiment, the body of the text or message is a single line of text across, for example, the bottom or top of the screen, similar to a closed caption display. If the text is longer than the displayable area on the screen, the text will be displayed one section at a time or scrolled. In that embodiment, the icon is displayed in the general area of the message, at the terminal end of the words being displayed, for example. This icon stays on the screen for the duration of the report and may be the logo of the transmitting station, or the logo of a company sponsoring the report.

Video reporter 10 also operates in a video interactive mode, to promote sales and store specials, for example. Participating broadcasters may send specially encoded message data, which includes the regular text display and data which is sent to a printer for printing a video coupon (See FIG. 9).

Video reporter 10 uses two new data channels (3 and 4) and can be configured to decode closed caption and teletext, decode, process and display closed caption text data, teletext and video reporter messages, and closed caption text, and teletext (in addition to video reports) can be simultaneously routed to the optional text to speech synthesizer, especially advantageous features for the visually and hearing impaired.

Since video reporter 10 implements the functionality of a closed caption decoder, the video reporter 10 uses a similar format for displaying a video reporter message as specified by the closed caption specifications (i.e., screen locations, foreground colors, background colors, character types, number of character/line, and so on) and video reporter 10 will support bit-mapped characters for displaying icons generated by overlay generator 600 described above.

Encoding Schemes

An NTSC TV frame consists of two interlaced fields, 262 lines each. Image transmission only occurs during lines 22 to 262. Lines 1 to 21 make up the vertical blanking interval (VBI) which the TV set uses for retracing and synchronizing. The usage of the time periods are shown below:
Lines 1–9: Vertical sync pulse
Lines 10–21: Free, with fixed assignments
Lines 10–12: Unusable
Lines 13–16: Available for data
Lines 17–19: Transmission control
Line 20: Available for data
Line 21: Captioning image transmission
Lines 22–262: Viewing signal
Lines 13 to 16, 20, and 21 are available for transmitting data. The video reporter 10 uses line 21 in order to be compatible with closed caption and teletext. A similar encoding strategy is used for video signals using the PAL and SECAM formats.

Referring to FIG. 8, the transmitted video reporter message consists of preamble 810, text/data 820, and trailer 830. Preamble 810 marks the transmission that follows as closed caption text, teletext, or video reporter message data. Preamble 810 and trailer (end of caption code) 830 are sent twice. The specification for closed caption decoders requires that any unassigned functions are ignored. The codes corresponding to video reporter 10 functions are treated as unassigned functions by a closed caption decoder and, therefore, ignored. Thus, video reporter messages will be ignored by a closed caption decoder and will not interfere with its normal operation.

Preamble 810 also identifies the video reporter message or emergency broadcast message type. The type of video reporter 10 message is determined by the first byte following the 2 byte preamble 810. The user can program video reporter 10 to include or ignore any of these message types. Table 3 lists examples of report categories and video reporter 10 report codes associated with each.

TABLE 3

| | Code | Description |
|---|---|---|
| 1 | 02H | News |
| 2 | 04H | Weather Warnings and Advisories |
| 3 | 06H | Sports Updates |
| 4 | 0AH | Video Interactive |
| 5 | 0CH | System Exclusive |

When a video reporter message is sent by the broadcasting stations, it is repeated several times. This enables video reporter 10 to scan through its channel list, pausing at each station long enough to determine whether a video reporter report is being transmitted by that station. If so, video reporter 10 will pause on that station and store the report in the microcontroller's 225 local memory and display it on the screen. When the display of the video reporter message is complete, video reporter 10 resumes scanning the channels. Video reporter 10 checks all messages received with the messages stored in its local memory (cache). Since video reporter 10 is intended to be used for transmitting timely information, a date/time code is appended to each message by microcontroller 225 so that video reporter messages are not duplicated.

Figure 9:
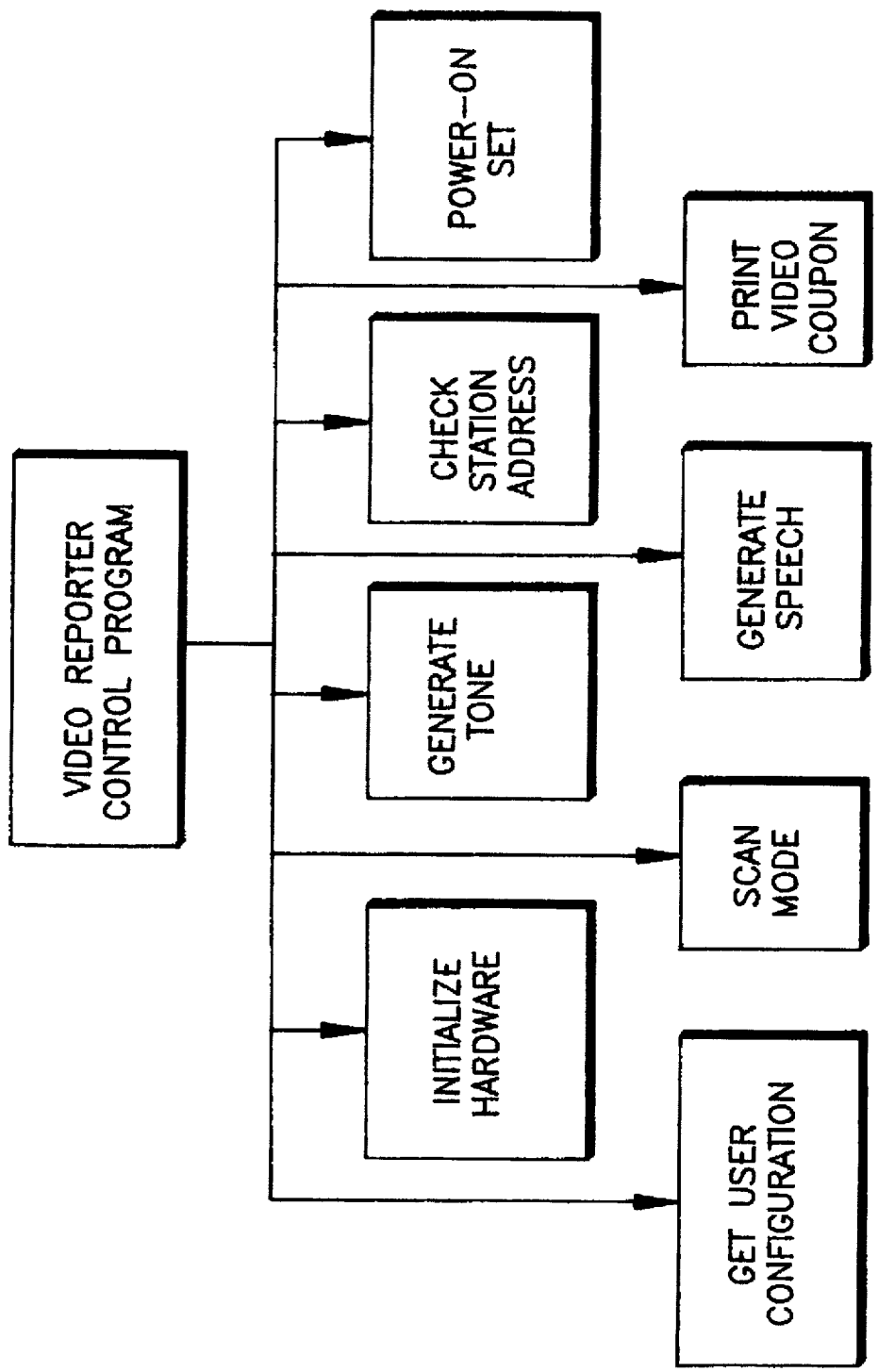
FIG. 9 is a simplified block diagram of the method of controlling and coordinating the video reporter shown in FIG. 2.
Figure 10:
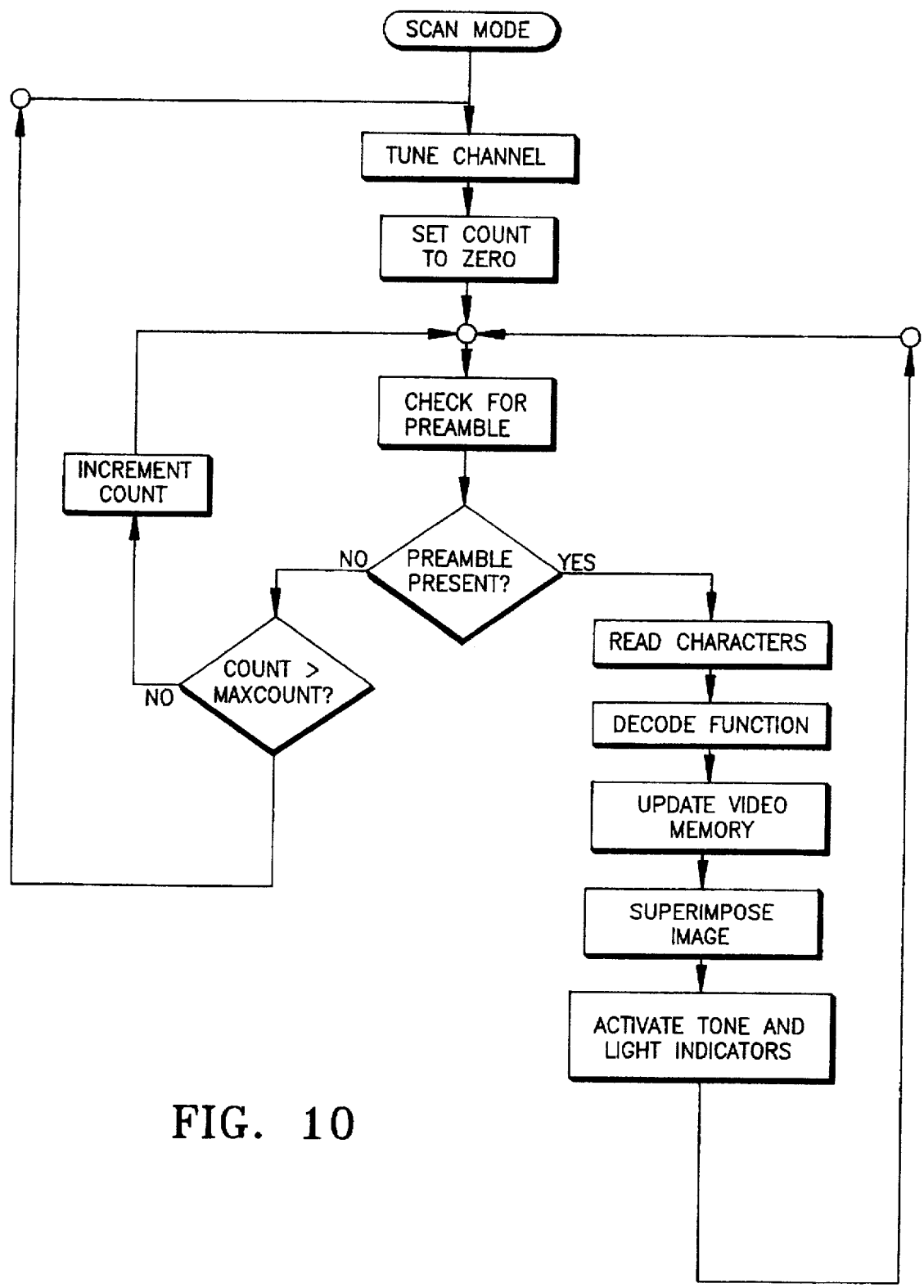
FIG. 10 is a simplified block diagram showing the scan mode of the video reporter shown in FIG. 2.

Microcontroller 225 has a program in ROM that controls the operation of video reporter 10. This program constantly instructs video reporter tuner 210 to tune to a channel, constantly checks for user input for changing the configuration, updates the display, constantly checks for preamble 810 from the data restored, Instructs video switch/ superimposer to display the message information if present, instructs tone generator 270 to generate an audible signal when a video reporter message is present, instructs text to speech synthesizer 280 to generate speech from the received text and power on and off the TV, all as shown in FIG. 9.

Using user interface controls 293 or remote control unit, the user's preference for the types of reports that may interrupt programming can be entered in microcontroller 225. The viewer can select whether video reporter 10 should turn the TV set on when a report is received and off following display, generate a tone at the beginning of the report, or synthesize a series of tones to alert the user. Text to speech synthesizer 280 can be activated. The viewer can receive video reporter messages that are geographically-specific by inputting a message address equal to the broadcast station address.

Figure 11:
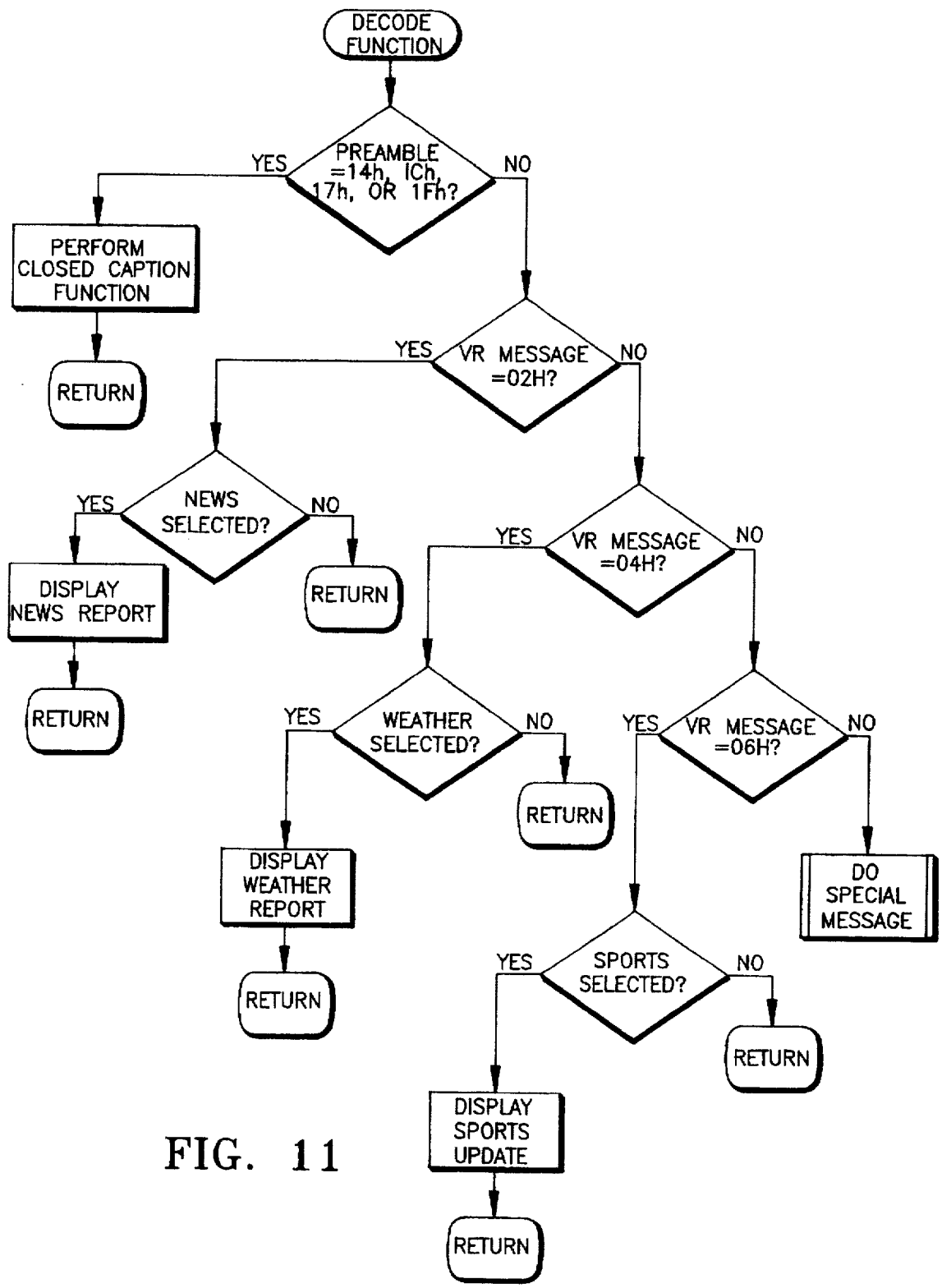
FIG. 11 is a simplified block diagram showing the computer microcontroller operation of the invention.
Figure 12:
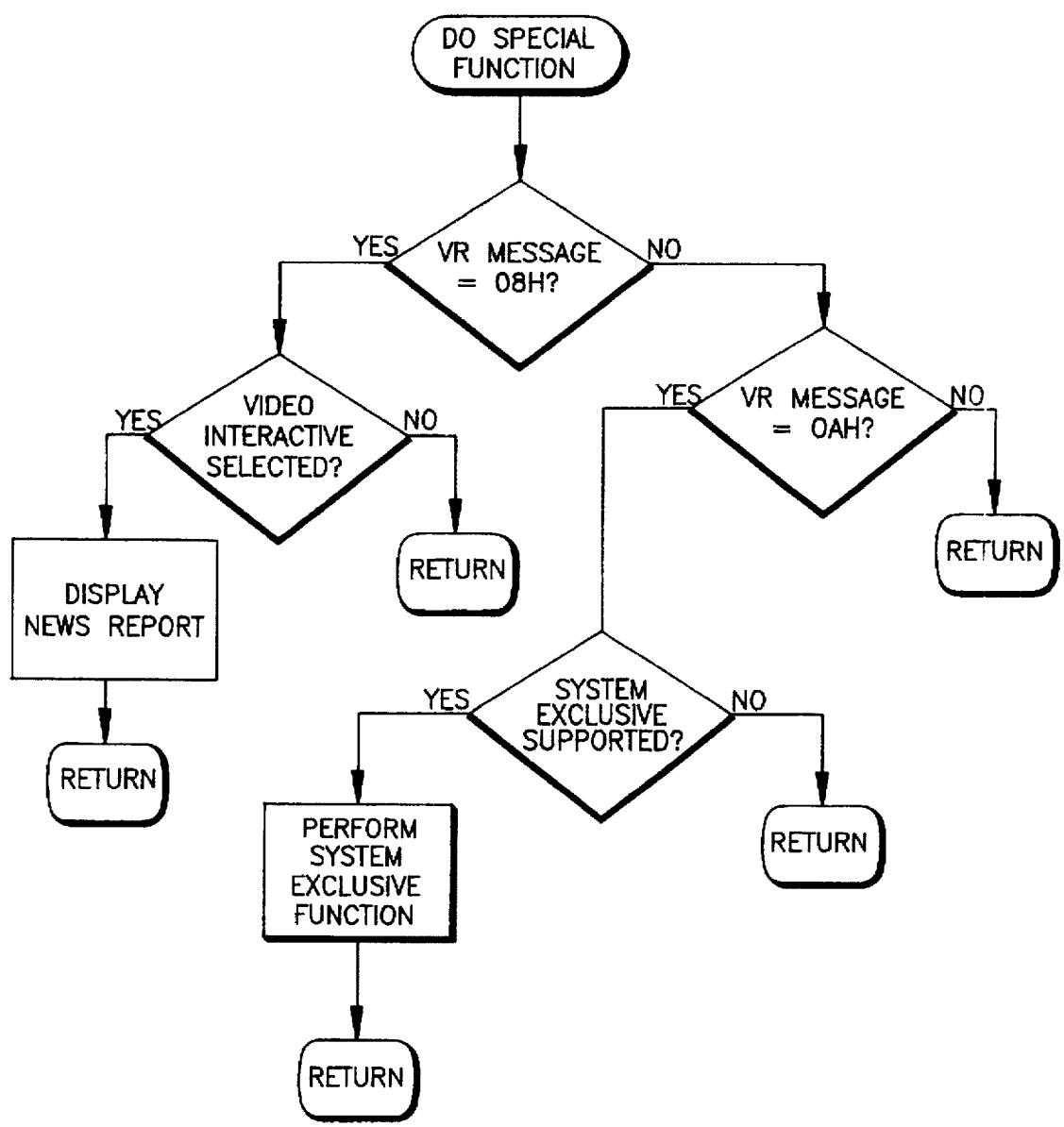
FIG. 12 is a simplified block diagram showing the logic of the system exclusive feature of the invention.

FIG. 11 describes the microcontroller 225 operation for a standard report type. Special messages correspond to the video interactive feature and the system exclusive. The video interactive stores a message in memory that can later be printed at the request of the user using the print video coupon option. The system exclusive feature is used to allow new commands to be downloaded into the program memory of video reporter 10. The logic for special function is shown in FIG. 12.

Video reporter 10 does not rely on the broadcaster who receives the initial emergency message alert to alert other broadcasters in a "daisy chain." Tuner 210, microcontroller 225 and superimposer 260 of video reporter 10 provide a method of interrupting any programming in progress with emergency broadcast messages regardless of which broadcast station personnel monitor to activate the EBS system.

Tuner 210 of video reporter 10 is capable of monitoring multiple sources for emergency messages and information and is compatible with all cable broadcasters.

Furthermore, video reporter 10 lends itself to unattended operation, is not dependent upon operators trained in EBS activation procedures, is inexpensive, easy to repair and can interact with all technologies.

By inputting a message address equal to the broadcast station address into microcontroller 225, video reporter 10 is capable of informing and alerting the public selectively depending, for example, on their geographic location in the event of an emergency.

Video reporter 10 is capable of simultaneously superimposing teletext data, emergency message data and closed caption text data on a television picture of any programing in progress.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A method for superimposing a real time video reporter message on a television picture concurrently with any programing in progress, which comprises the steps of:
   splitting a television broadcast signal into at least a first television signal and a second video reporter signal;
   continuously tuning the video reporter signal for predetermined channels having video reporter data thereon;
   repeating the tuning step until video reporter data is detected;
   decoding the video reporter data;
   extracting messages from the video reporter data;
   selecting the messages to be superimposed on the television picture;
   generating a video signal from the video reporter data for superimposing over the television picture; and,
   superimposing the video signal over the television picture of the programing in progress.

2. The method of claim 1 further comprising the step of synthesizing an audio message from the messages to be superimposed following the selecting step.

3. The method of claim 2 further comprising the step of generating an audible tone for alerting a viewer to the messages to be superimposed before the superimposing step.

4. The method of claim 3 further comprising the step of producing a visual indicator to alert a viewer to the messages to be superimposed before the superimposing step.

5. The method of claim 4 wherein the television broadcast signal includes teletext and closed caption text data, and the superimposing means is capable of superimposing various data simultaneously over the television picture in progress, the various data selected from the group consisting of video reporter data, teletext and closed caption text data.

6. The method of claim 5 further comprising the step of powering a television on before the superimposing step and powering the television off following the superimposing step.

7. The method of claim 6 further comprising the step of interrupting VCR programing in progress before the superimposing step, such that the various data can be superimposed over a VCR programing television picture.

8. The method of claim 6 further comprising the step of interrupting video game programing in progress before the superimposing step, such that the various data can be superimposed over a video game programing television picture.

9. The method of claims 7 or 8, further comprising the step of temporarily storing the messages to be superimposed following the superimposing step.

10. A video reporter for superimposing real time emergency broadcast messages and information on a television picture concurrently with any programing in progress comprising;
    signal splitting means for splitting a television broadcast signal into at least a first television signal and a second video reporter signal;
    tuning means for continuously tuning the video reporter signal for predetermined channels having video reporter data thereon;
    decoding means for decoding the video reporter data;
    message extracting means for extracting messages from the video reporter data;
    message selecting means for selecting the messages to be superimposed on the television picture;
    overlay generating means for generating a video signal from the video reporter data for superimposing over the television picture; and,
    superimposing means for superimposing the video signal over the television picture of the programing in progress.

11. The video reporter of claim 3 further comprising a first programing means for selectively programing input data, the input data includes the channels to be scanned and the type of messages to be superimposed on the television picture.

12. The video reporter of claim 11 further comprising storing and retrieving means for storing and retrieving the video reporter data and the input data.

13. The video reporter of claim 12 further comprising a second programing means for selectively programing at least one video reporter-specific address such that the video reporter can receive the television broadcast signal from a particular broadcast station as desired.

14. The video reporter of claim 13 further comprising text to speech synthesizing means for synthesizing an audio message from the messages to be superimposed.

15. The video reporter of claim 14 further comprising tone generating means for generating an audible tone for alerting a viewer to the messages to be superimposed.

16. The video reporter of claim 14 further comprising visual indicator producing means for producing a visual indicator to alert a viewer to the message.

17. The video reporter of claim 16 wherein the television broadcast signal includes teletext and closed caption text data, and the superimposing means is capable of superimposing various data simultaneously over the television picture in progress, the various data selected from the group consisting of video reporter data, teletext and closed caption text data.

18. The video reporter of claim 17 further comprising computer microcontroller means for operating the video reporter.

19. The video reporter of claim 18 further comprising printing means for printing the various data.

20. The video reporter of claim 19 further comprising VCR interrupting means for interrupting VCR programing in progress, such that the various data can be superimposed over a VCR programing television picture.

21. The video reporter of claim 20 further comprising video game interrupting means for interrupting video game programing in progress, such that the various data can be superimposed over a video game programing television picture.

22. The video reporter of claim 21 further comprising television power switching means for powering a television on and off.

23. The video reporter of claim 22 wherein the video reporter is housed within a television set.

24. A method for controlling and coordinating the operation of a video reporter involved in the process of simultaneously superimposing various data over a television picture of any programing in progress, which comprises the steps of:

constantly reading user input data storage means for detecting user input data;

constantly determining command functions of a video reporter from the input data;

constantly revising the command functions in consideration of the user input data;

instructing a tuning means for continuously tuning a video reporter signal to scan predetermined channels until video reporter data is detected by the tuning means;

selecting and extracting messages imbedded in the video reporter data for superimposing over a television picture;

instructing tone generating means to generate an audible tone for alerting a viewer to the messages to be superimposed;

instructing text to speech synthesizing means to synthesize an audio message from the messages to be superimposed;

powering on a television set;

initiating superimposing means for superimposing the video reporter data over the television picture of the programing in progress;

initiating storage and retrieving means for storing and retrieving the video reporter data; and, powering off the television set.

25. The method of claim 24 wherein the video reporter signal includes teletext and closed caption text data, and the superimposing means is capable of superimposing various data simultaneously over the television picture in progress, the various data selected from the group consisting of video reporter data, teletext and closed caption text data.

* * * * *